United States Patent [19]
Le Marchand

[11] 3,729,070
[45] Apr. 24, 1973

[54] MANUAL RELEASE MECHANISM FOR AN EMERGENCY AND PARKING BRAKE

[75] Inventor: Claude Le Marchand, 95 Domont, France

[73] Assignee: Societe Anonyme D. B. A.

[22] Filed: May 4, 1971

[21] Appl. No.: 140,074

[30] Foreign Application Priority Data

| | | |
|---|---|---|
| May 5, 1970 | France | 7016324 |
| June 1, 1970 | France | 7019972 |
| Mar. 2, 1971 | France | 7107093 |

[52] U.S. Cl.................188/170, 92/130, 188/2 D, 188/216
[51] Int. Cl. ........................................F16d 59/02
[58] Field of Search...........92/63, 64, 130, 137; 188/2 D, 170, 216

[56] References Cited

UNITED STATES PATENTS

| | | | |
|---|---|---|---|
| 3,036,668 | 5/1962 | Falk et al. | 188/2 D UX |
| 3,144,812 | 8/1964 | Rager et al. | 188/2 D UX |
| 3,240,129 | 3/1966 | Cruse | 92/130 |
| 3,394,779 | 7/1968 | Nicolay et al. | 188/216 X |

*Primary Examiner*—Duane A. Reger
*Attorney*—W. N. Antonis and Plante, Hartz, Smith & Thompson

[57] ABSTRACT

Manual release mechanism for an emergency and parking brake control system utilizing a fluid pressure operated spring cylinder, a transmission cable stretched between the piston contained in this cylinder and a brake control lever being guided by a sheath, the ends of said sheath taking anchor on a pair of stops respectively connected to stationary parts. The mechanism comprises two relatively slidable members, one connected to one of the stops, the other one connected to the adjacent stationary part, these members being normally locked in the position of their maximum extension. Release of the emergency brake is obtained by releasing the locked members, thus allowing the stop of the sheath to move to a position in which the tension of the cable is relieved. One of the members can be a socket connected to the cylinder body, the other member being then a plug connected to the stop and slidably received in the socket, a projection on the plug and a notch in the socket allowing these members to be mutually locked or unlocked when one of the members is rotated while the projection is facing the notch. Embodiments are described in which re-locking of the members occurs automatically upon reinstating fluid pressure in the spring cylinder.

8 Claims, 12 Drawing Figures

Patented April 24, 1973

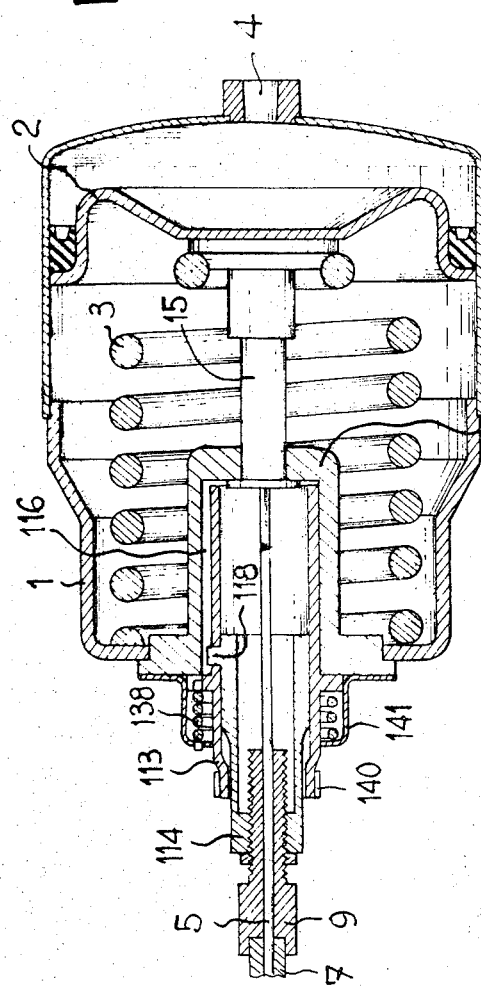
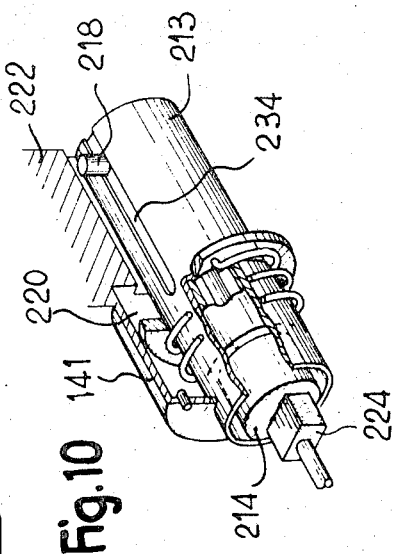
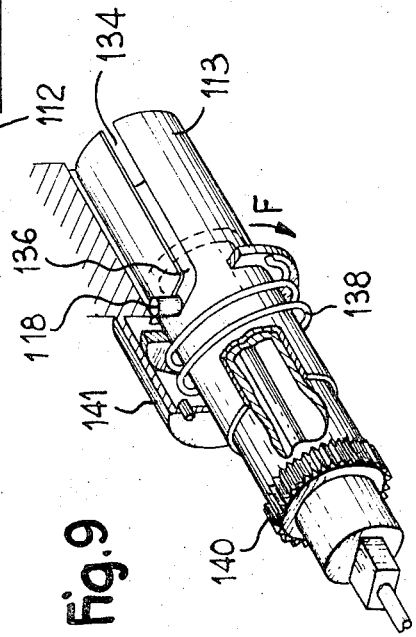

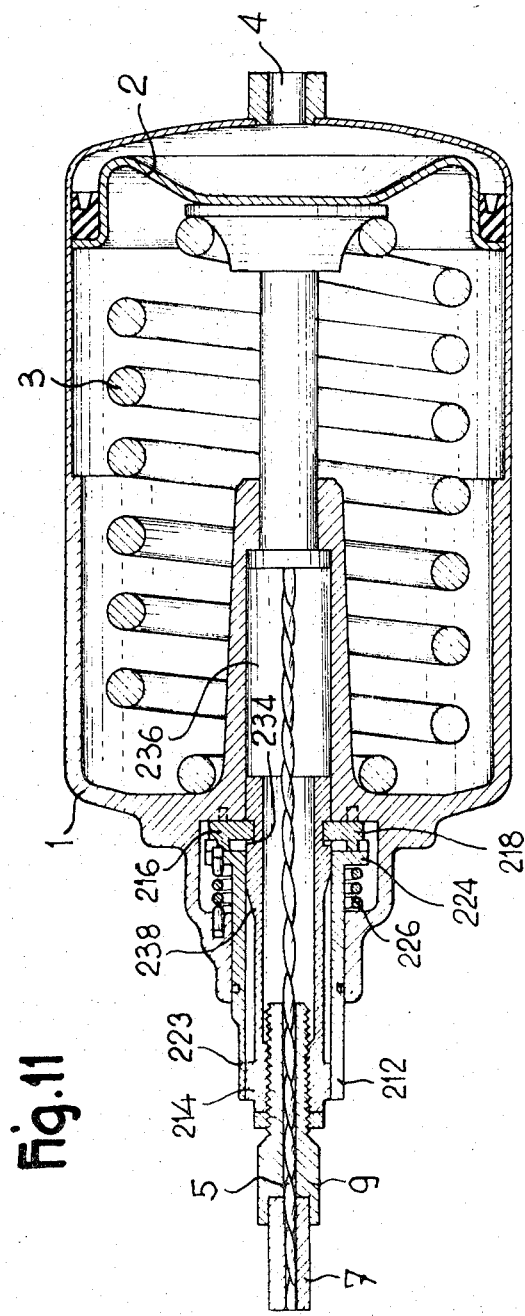
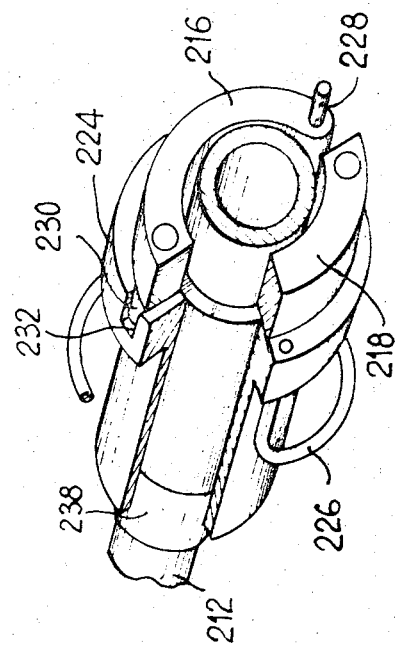
Fig.11
Fig.12

3,729,070

MANUAL RELEASE MECHANISM FOR AN EMERGENCY AND PARKING BRAKE

This invention relates to a manual release mechanism for an emergency and parking brake system utilizing a spring cylinder and a cable transmission.

Conventional emergency and parking brake systems comprise a pneumatic or hydraulic cylinder in which a piston connected to a brake control lever keeps a spring under compression as long as the cylinder is supplied with fluid pressure. When the cylinder is not supplied with fluid pressure, the piston is urged by the spring to a position in which the brakes are applied by the force of the spring. The absence of fluid pressure may be due either to a fault in the fluid conduits, or to the actuation of a valve by an operator when parking the vehicle.

A manual release mechanism is generally provided for allowing the vehicle to be removed from a dangerous or awkward spot such as a cross-roads or a level crossing when the brake controls are inoperative, for example when a conduit is ruptured. Known types of manual release mechanisms use a screw and nut assembly for cancelling the action of the spring either by re-compressing the spring or by displacing the anchoring point of a movement transmitting means including a control rod or a control cable. With such an arrangement, the manual release of the brakes necessitates more time than is adequate in a case of emergency, and so much more time is required as the stroke of the piston is greater.

An object of the invention is to provide a manual release mechanism with which the release of the brakes is obtained very quickly, independently of the length of the piston stroke.

In the invention, the manual release mechanism is included in an emergency and parking brake system utilizing a fluid pressure brake operated spring cylinder formed of a cylinder body end of a piston, a transmission cable stretched between a rod of said piston and a brake control lever being guided by a sheath, respective ends of said sheath abutting a pair of stops which are respectively connected to a part stationary with respect to the piston and to a part stationary with respect to the control lever. According to the invention, the manual release mechanism comprises a first member rigidly connected to one of said stationary parts and a second member rigidly connected to the other stationary part, said members being slidable with respect to each other, locking means being provided for normally maintaining said members in the position of their maximum extension. According to a preferred embodiment, the first member is a socket connected to the cylinder body, while the second member is a plug extending from an outer end of the socket to be slidably received in said socket, locking means operable by relative rotation of the socket and the plug being provided for normally maintaining these members in a mutually locked position when they are at a maximum extension, said piston rod extending from the inner end of the socket to be also slidably received in said socket, said piston and piston rod being moved inwardly in the absence of fluid pressure so as to apply the brakes in emergency and parking conditions, whereby manual rotation of the plug with respect to the socket under such conditions will result in unlocking these members to allow the plug to slide in the socket and release the brakes.

FIG. 8 represents in cross-section a spring cylinder utilizing a manual release mechanism according to another embodiment of the invention.

FIG. 9 is a perspective view of the mechanism of FIG. 8.

FIG. 10 is a perspective view according to a variant of the of the mechanism illustrated in FIG. 9.

FIG. 11 represents in cross-section a spring cylinder utilizing a manual release mechanism according to a modified embodiment of the invention.

FIG. 12 is a perspective view partially representing the mechanism illustrated in FIG. 11.

Figure 1:
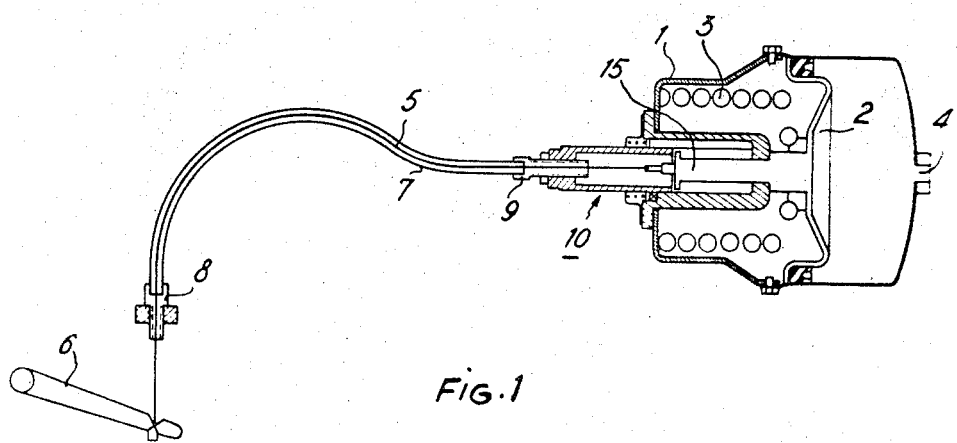
FIGS. 1, 2 and 3 are simplified views illustrating different positions of an emergency and parking brake system incorporating a manual release mechanism according to the invention.

FIG. 1 is a simplified representation of a braking system showing a spring cylinder and a manual release mechanism according to the invention. The arrangement comprises a cylinder 1 in which a piston 2 is urged against the force of a spring 3 by a pressurized fluid arriving through an inlet orifice 4. One end of a cable 5 is secured to a rod 15 of the piston, and the other end of the cable is secured to a brake control lever. In FIG. 1, the cable 5 is in a loose condition in which the brake is released.

Over the major part of its length, the cable 5 is slidably received in a yielding sheath 7 imposing the cable to follow a curved path. One end of the sheath 7 takes anchor on a fixed stop 8, while the other end of the sheath takes anchor on a displaceable stop 9 which is part of the release mechanism of the invention, generally designated by the numeral 10. It will be understood that both stops could be displaceable.

The release mechanism 10 will be described in detail later, and reference will first be made to FIGS. 2 and 3 in order to describe the mode of release which is viewed in the invention.

The position shown in FIG. 1 corresponds to the driving condition of the vehicle.

Figure 2:
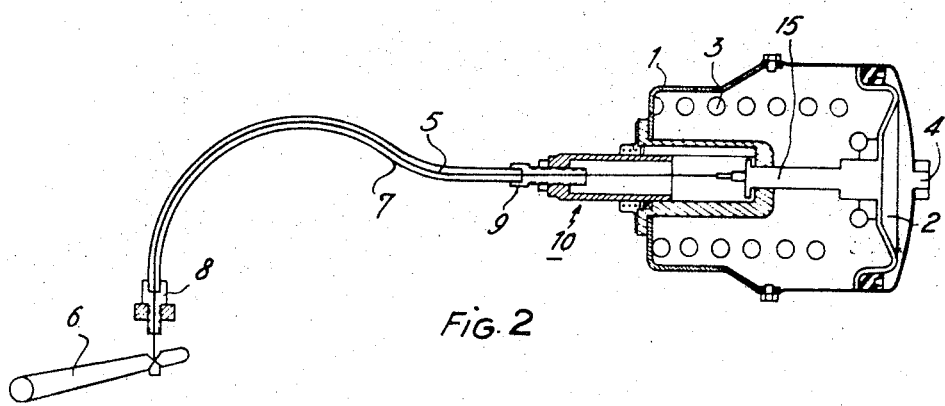

FIG. 2 illustrates the "spring brake applied" position occuring in the absence of fluid pressure, either when an operator has turned off a valve in the vehicle booth, or in case of a failure such as a ruptured fluid conduit. Since there is no fluid pressure, piston 2 is urged toward the head of the cylinder 1 by the spring 3. The piston 2 pulls the cable 5 and the lever 6 in a brake applying direction to bring forth a parking or an emergency braking condition.

Both in FIGS. 1 and 2, the manual release mechanism 10 occupies the same position which will be referred to as the normal position of this mechanism.

Figure 3:
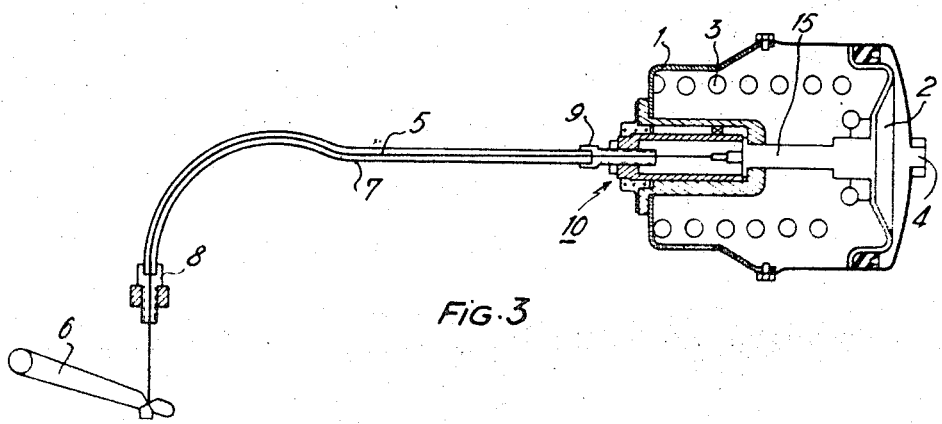

FIG. 3 illustrates the "manually released" position which enables the vehicle to be displaced in an emergency when the brake controls are inoperative on account of an accidental absence of the fluid pressure. It can be seen that, by means of the mechanism 10, the end of sheath 7 has been carried nearer to the point at which the cable 5 is secured to the piston rod 15. The tension of the cable 5 is then relieved, thus allowing the brake control lever 6 to resume the position in which the brake is released.

The manual release mechanism 10 of the invention allows the manually released position to be obtained quickly.

Figure 4:
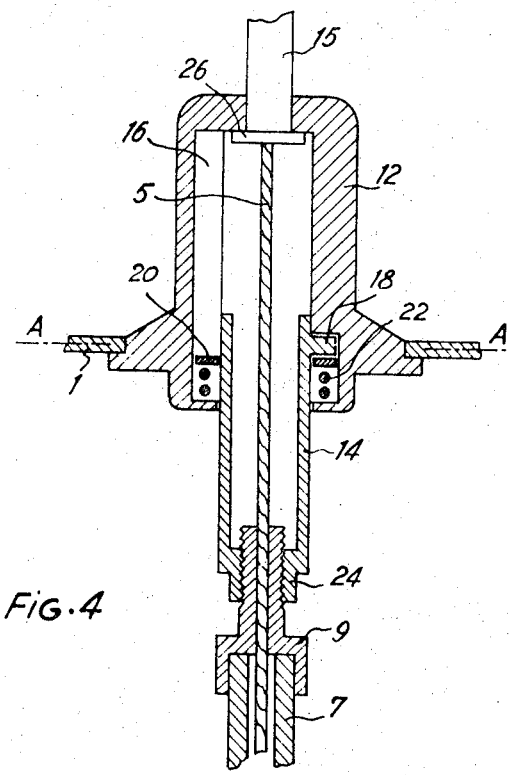
FIG. 4 is a cross-sectional front view of the manual release mechanism.
Figure 5:
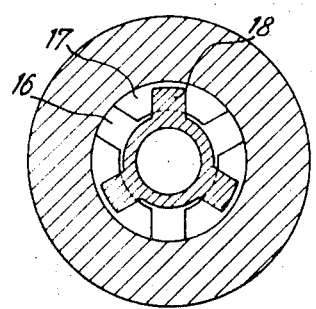
FIG. 5 is a cross-sectional view of the mechanism, taken along the line A—A of FIG. 4.

In a first embodiment illustrated in FIGS. 4, 5, 6 and 7, the mechanism 10 is essentially constituted by a socket 12 secured to the end of the spring cylinder 1 and by a plug 14 slidingly received in the socket 12. Projections 18 formed around the plug 14 are slidingly received in corresponding guiding grooves 16 formed in the inner wall of the socket 12. However, the guiding grooves 16 are interrupted in the outer end region of the socket 14 to form a cylindrical cavity which accomodates a washer 20 urged inwardly by a spring 22. As shown in FIG. 4, when the plug 14 is moved outwardly, the projections 18 will bear on the washer 20 against the force of the spring 22 to be contained within the cylindrical cavity, and the plug 14 can be rotated to place the projections 18 against the ends of the ribs 17 separating adjacent guiding grooves 16, as best seen in FIG. 5. Thus, the plug 14 will be locked. The outer end of the plug 14, on which the stop 9 for the sheath 7 is secured, comprises a flat or a polygonal portion adapted to receive a tool for rotating the plug 14.

Figure 7:
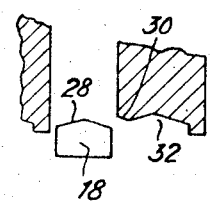
FIG. 7 illustrates a detail of the mechanism.

A detail facilitating the plug 14 to be held in the locked position is shown in FIG. 7. In this arrangement, inclined surfaces 28 are formed on the tops of projections 18, while the end of each rib 17 comprises a chamber 30 and a recess 32 adapted to receive the inclined surfaces 28.

Figure 6:
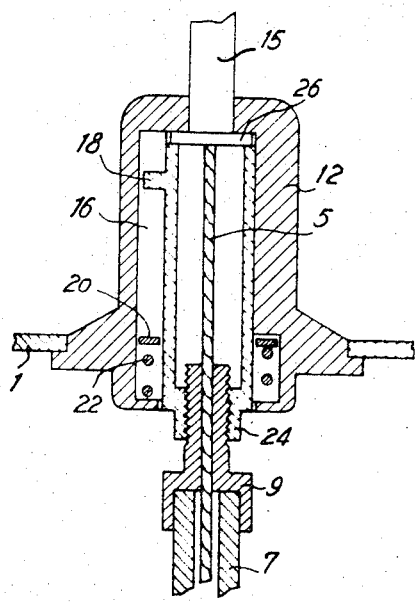
FIG. 6 represents the mechanism of FIG. 4 in another position.

As shown in FIGS. 4 and 6, the piston rod 15 is slidably received through an opening formed at the inner end of the socket 12 and, within the socket 12, a guiding flange 26 is formed at the end of the piston rod. The cable 5 is secured to the end of the piston rod 15 and penetrates in the sheath 7 through a passage in the stop 9.

In the normal position of the manual release mechanism 10, the plug 14 is locked as shown in FIGS. 4 and 5. The piston rod 15 is then free to move axially, so as to allow the piston 2 to place the vehicle either in the driving condition shown in FIG. 1 or in the spring brake applied condition shown in FIG. 2, according to whether the cylinder 1 is supplied or not with fluid pressure.

FIG. 4 corresponds to the spring brake applied position and, from this position, the manually released position illustrated in FIGS. 3 and 6 will be readily obtained by rotating the plug 14 with a tool placed on the portion 24. As the plug rotates, the projections 18 will come in alignment with the grooves 16 in the socket 12 and, due to the reaction of the sheath 7, the plug will slide in the socket, thus relieving the tension of the cable 5 until the brake is released.

With this embodiment, it requires two steps to reset the manual release mechanism to its normal position of FIG. 4. In the first step, fluid pressure is restored in the spring cylinder 1, which causes the piston 2 to move and compress the spring 3, while the piston rod 15 repels the plug 14 outwardly. In the second step, the plug 14 is rotated by means of a tool placed on the portion 24, so as to set the projections 18 against the ends of the ribs 17.

With the subsequent embodiments, the manual release mechanism is automatically reset when fluid pressure is restored in the spring cylinder.

In the embodiment shown in FIGS. 8 and 9, guiding grooves formed 116 in the socket 112 slidingly receive projections 118 formed around the plug 114, rotation of the plug with respect to the socket being thus prevented. The projections 118 extend through longitudinal slots 134, best seen in FIG. 9, formed in an intermediate tubular member 113 located between the socket 113 and the plug 114. Each longitudinal slot 134 terminates in a short circumferentially directed slot forming a recess 136.

A spring 138 has one end connected to the tubular member 113 and its other end connected to a cap member 141 secured to the outer end of the socket 112. The force of the spring 138 tends to rotate the tubular member 113 in the direction of the arrow F, in which the projections 118 penetrate in the recesses 136. Moreover, the outer end of the tubular member 113 comprises a knurled portion 140 on which a tool can be placed for rotating the member 113 against the force of the spring 138.

In the normal position of the manual release mechanism, the projections 118 are caught in the recesses 136, thus preventing the plug 114 from sliding in the socket 112.

The manually released position is obtained by rotating the tubular member 113 by means of a tool placed on the knurled portion 140, so as to move the recesses 136 away from the projections 118. These projections being then received in the longitudinal slots 134, the plug 114 is now free to move axially in the socket 112, although it is held against rotation about its axis due to the fact that the projections 118 are guided in the grooves 116. As the plug moves axially, the tension of the cable 5 is relieved until the brake is released, since the stop 9 of the sheath 7 moves with the plug.

The mechanism is automatically reset to its normal position when fluid pressure is restored in the spring cylinder 1. It can be seen that, in a first step, the piston rod 15 repels the plug 114 until the projections 118 are facing the recesses 136 and, in a second step, the tubular member 113 is rotated about its axis by the spring 138 to insert again the projections into the recesses, thus locking the plug 114.

In the variant shown in FIG. 10, rotation of the intermediate tubular member 213 about is axis produces, due to the thrust of the slots 234 on the projections 218, a corresponding rotation of the plug 214, when the projections 218 are contained within a cylindrical cavity 220 formed at the end of the guiding grooves formed in the socket 212. The projections 218 are then positioned against the ends of the ribs separating adjacent grooves. In this case, the manually released position is obtained by rotating the plug 214. To this effect, the end of the plug 214 comprises a polygonal portion on which a tool can be placed. Resetting of the mechanism to normal position is obtained automatically as in the embodiment of FIGS. 8 and 9.

In the embodiment shown in FIGS. 11 and 12, a socket 212 is connected to the cylinder body so as to be axially fixed, but rotatable about its axis. The outer end 222 of the socket 212 is adapted to receive a tool for rotating this socket. The inner end of the socket is formed with a flange 224. A spring 226 having one end connected to the flange 224 and its other end to the cylinder body 1 tends to rotate the socket 212. In FIG. 12, it can be seen that a pair of articulated segments 216, 219 are mounted adjacent the outer surface of flange 224. Each segment is pivoted on a pin 228 connected to the cylinder body 1, and comprises a projection 230 received in a slot 232 formed in the socket flange.

A plug 214 is slidably received in the socket 212. The articulated segments 216, 219 form a pair of jaws embracing this plug and, as shown in the figures, the segments 216,218 are received in a circular groove 234 formed in the plug, thus preventing axial movement of the plug.

This position is the normal position of the manual release mechanism.

The manually released position can be readily obtained by rotating the socket 121 by means of a tool placed on the end 222. The walls of the slots 232 are then applying a thrust on the projections 230, and this causes the segments 216,219 to be spread apart by rotating about the pins 228. As they are spread apart, the segments move away from the groove 234 and no longer retain the plug 214. Reacting to the tension of the cable 5, the sheath 7 pushes the stop 9 and the plug 214 toward the piston 2. The plug 214 penetrates then into a chamber 236 until the tension of the cable is relieved and the brake is released.

When fluid pressure is restored in the cylinder 1, the piston 2 urges the plug 214 outwardly, and the plug becomes locked when the groove 234 is facing the articulated segments 216,219, thus automatically resetting the manual release mechanism.

According to an advantageous feature, the slots 232 formed in the plug flange can be rectilinear and have a practically radial direction. In particular, this permits a reversible operation. Thus, when the plug is inside the chamber 236 in the manually released position of the mechanism, the segments 216,219 can embrace a portion of reduced diameter, this portion being connected to the large diameter of the plug at the location of the groove 234 through a conical transition 238.

The manufacture of the embodiment shown in FIGS. 11 and 12 is particularly easy, since the parts are essentially cylindrical, and the only particular machining operation relates to the slots 232, and the machining of straight radial slots is very simple.

I claim:

1. In a vehicle, a braking system having a mechanical actuator and fluid pressure responsive means including resilient means for actuating said mechanical actuator comprising:

said fluid pressure responsive means including a housing carried by said vehicle defining a chamber therewithin and a fluid pressure responsive piston slidably mounted in said chamber, flexible means operatively connecting said piston with said mechanical actuator for operating the latter, said resilient means yieldably urging said piston to a first position actuating said mechanical actuator; and a manual release mechanism for releasing said mechanical actuator when said piston is disposed in said first position, said release mechanism including a sheath for guiding said cable means, means securing one end of said sheath to a fixed portion of the vehicle, means securing the other end of said sheath to said vehicle, said last-mentioned means including first and second members movable relative to one another in an axial direction, said first member being carried by a fixed portion of the vehicle and said second member being carried on said sheath, and locking means normally maintaining said members in the position of their maximum extension.

2. The invention of claim 1:

said first member being a socket carried by said housing, said second member being a plug slidably received by one end of said socket, said locking means being operable by rotating said plug from a first position maintaining said members at their maximum extension to a second position permitting the plug to withdraw into said socket, and a rod carried by said piston extending through the other end of said socket.

3. The invention of claim 2:

said locking means including means projecting from the outer surface of said plug, and axially extending grooves with said socket for receiving said projecting means, ribs separating said grooves, said ribs terminating within said socket to define a circumferentially extending cavity between the end of the grooves and the one end of the socket, said plug being rotatable from said first position in which the projecting means engage the ends of said ribs defining said cavity to thereby lock said plug against movement relative to the socket to a second position in which the projecting means are aligned with the grooves to permit the plug to withdraw into said socket.

4. The invention of claim 2:

said locking means including means projecting from the outer surface of said plug, and axially extending grooves within said socket cooperating with said projecting means, a sleeve disposed between the plug and the socket having an axially extending slot means receiving said projecting means and detents cooperating with said projecting means to lock said plug against movement relative to the socket, said sleeve being secured against movement axially with respect to said members but rotatable about its axis, and resilient means yieldably rotating said sleeve to urge said projections into engagement with said detents.

5. The invention of claim 4:

said detents being circumferential recesses located at the ends of said slots in said sleeve, said socket being rotatable to align said projections with said slots and with said grooves.

6. The invention of claim 4:

said locking means including ribs separating said grooves, said ribs terminating within said socket to define a circumferential cavity between the ends of the ribs and said one end of the socket.

7. The invention of claim 2:

said locking means including an annular groove on said plug, said socket being restricted from movement axially with respect to said plug but being rotatable about its axis, an articulated segment pivotally mounted on said housing and adapted to be received within said annular groove and being operably connected to said socket so that rotation of the latter drives the segment into said groove, and resilient means yieldably rotating said segments in a direction driving the latter into the groove.

8. The invention of claim 7:

the connection between the segment and the socket including a projecting member on said segment, said socket having a slot receiving said projecting member.

* * * * *